(12) United States Patent
Lee et al.

(10) Patent No.: US 12,482,256 B2
(45) Date of Patent: Nov. 25, 2025

(54) METHOD AND APPARATUS FOR COMPRESSION OF A TASK OUTPUT BY MACHINE LEARNING

(71) Applicants: Electronics and Telecommunications Research Institute, Daejeon (KR); Myongji University Industry and Academia Cooperation Foundation, Yongin-si (KR)

(72) Inventors: Jin-Young Lee, Seoul (KR); Hee-Kyung Lee, Daejeon (KR); Sang-Kyun Kim, Seongnam-si (KR)

(73) Assignees: Electronics and Telecommunications Research Institute, Daejeon (KR); Myongji University Industry and Academia Cooperation Foundation, Yongin-si (KR)

( * ) Notice: Subject to any disclaimer, the term of this patent is extended or adjusted under 35 U.S.C. 154(b) by 529 days.

(21) Appl. No.: 17/845,662

(22) Filed: Jun. 21, 2022

(65) Prior Publication Data
US 2022/0406051 A1    Dec. 22, 2022

(30) Foreign Application Priority Data

Jun. 22, 2021 (KR) ........................ 10-2021-0081155
May 23, 2022 (KR) ........................ 10-2022-0062820

(51) Int. Cl.
*G06K 9/00*        (2022.01)
*G06V 10/22*       (2022.01)
(Continued)

(52) U.S. Cl.
CPC .............. *G06V 10/96* (2022.01); *G06V 10/22* (2022.01); *G06V 10/56* (2022.01); *G06V 10/82* (2022.01)

(58) Field of Classification Search
CPC ......... G06V 10/96; G06V 10/22; G06V 10/82
See application file for complete search history.

(56) References Cited

U.S. PATENT DOCUMENTS 10,043,095 B2   8/2018   Yang et al.
10,325,147 B1   6/2019   Yang et al.
(Continued)

FOREIGN PATENT DOCUMENTS

CN    109101858 A    12/2018
CN    109862370 A     6/2019
(Continued)

OTHER PUBLICATIONS

Ruder, Sebastian, An Overview of Multi-Task Learning in Deep Neural Networks, Insight Center for Data Analytics, NUI Galway, arXiv:1706.05098v1, Dublin, Ireland, Jun. 15, 2017.

*Primary Examiner* — Gregory A Morse
*Assistant Examiner* — Owais Iqbal Memon
(74) *Attorney, Agent, or Firm* — WILLIAM PARK AND ASSOCIATES LTD.

(57) ABSTRACT

Disclosed herein are a method and apparatus for distributed image data processing. The method for distributed image data processing includes performing machine learning on an
(Continued)

original image to produce a plurality of different task outputs, combining the plurality of task outputs to extract at least one final output, and compressing the final output and transmitting the final output to a server.

7 Claims, 11 Drawing Sheets

(51) Int. Cl.
*G06V 10/56* (2022.01)
*G06V 10/82* (2022.01)
*G06V 10/96* (2022.01)

(56) References Cited

U.S. PATENT DOCUMENTS

| | | | |
|---|---|---|---|
| 10,331,983 | B1 | 6/2019 | Yang et al. |
| 10,366,328 | B2 | 7/2019 | Yang et al. |
| 10,387,772 | B1 | 8/2019 | Yang et al. |
| 10,891,524 | B2 | 1/2021 | Honkala et al. |
| 11,935,377 | B1* | 3/2024 | Xu .................. G08B 13/19643 |
| 2011/0150328 | A1 | 6/2011 | Han et al. |
| 2018/0063538 | A1* | 3/2018 | Bernal ..................... G06N 5/02 |
| 2019/0130580 | A1* | 5/2019 | Chen ...................... G06V 10/82 |
| 2019/0273948 | A1 | 9/2019 | Yin et al. |
| 2020/0004777 | A1 | 1/2020 | Araujo et al. |
| 2020/0182648 | A1 | 6/2020 | Kang et al. |
| 2020/0342232 | A1 | 10/2020 | Yang et al. |
| 2021/0012177 | A1 | 1/2021 | Yang et al. |
| 2022/0385907 | A1* | 12/2022 | Zhang .................. H04N 19/103 |

FOREIGN PATENT DOCUMENTS

| | | |
|---|---|---|
| CN | 110147699 A | 8/2019 |
| CN | 110163052 A | 8/2019 |
| CN | 110290386 A | 9/2019 |
| CN | 110300301 A | 10/2019 |
| CN | 110662080 A | 1/2020 |
| CN | 110677644 A | 1/2020 |
| CN | 111163318 A | 5/2020 |
| CN | 110225341 B | 8/2020 |
| EP | 3633990 A1 | 4/2020 |
| KR | 1020170070715 A | 6/2017 |
| KR | 1020210029110 A | 3/2021 |
| WO | 2019141896 A1 | 7/2019 |
| WO | 2019222951 A1 | 11/2019 |
| WO | 2020008104 A1 | 1/2020 |
| WO | 2020034078 A1 | 2/2020 |
| WO | 2020034083 A1 | 2/2020 |

* cited by examiner

```
XMin,XMax,YMin,YMax
0.001443387,0.132339701,0.007576371,0.417911997
0.903834403,1,0.218712608,0.545774384
0.016296538,0.986642897,0.070965157,0.97432187
0.897683382,0.999211609,0.136328885,0.235476833
0.015724119,0.589125395,0.023097706,0.442769714
0.034655105,0.973111629,0.046142694,0.98171064
0.706643224,1,0.026592559,0.450207438
0.03264619,0.445213735,0.00886589,0.446191695
0.703702152,1,0.025029773,0.477656625
0.898465574,1,0.18003506,0.541414472
0.018508079,0.609663904,0.016137467,0.560060757
0.048416894,0.133747652,0.007556114,0.260004604
0.237737072,0.988485535,0.228776231,0.988495529
0.002100744,0.278531634,0.525226533,0.989405036
0.091204413,0.998814506,0.24582164,0.983194709
0.028994444,0.98377081,0.229267672,0.984789252
0.002808038,0.990608807,0.239236996,0.988004506
0.113444673,0.985248527,0.237277448,0.977335453
0.352229327,0.884568214,0.314844,0.738466858
0.015827656,0.938850403,0.075441208,0.985226917
0,0.960397065,0.152948189,0.981517851
```

FIG. 7

| Dataset | Data | Size | BPP |
|---|---|---|---|
| Open Images (Detection) | Image | 1444MB | 3.1566397 |
| | Original result (text) | 2.89MB | 0.0063288 |
| | XML | 8.6MB | 0.0187448 |
| | BiM | 0.8MB | 0.0017493 |
| COCO dataset (Segmentation) | Image | 777MB | 4.7620897 |
| | Original result (JSON) | 8.9MB | 0.0545489 |
| | XML | 12MB | 0.0735491 |
| | BiM | 2.8MB | 0.0171614 |

FIG. 9

| Dataset | Original mAP | Restored mAP |
|---|---|---|
| Open Images (Detection) | 58.182 | 58.133 |
| COCO dataset (Segmentation) | 37.168 | 37.006 |

FIG. 10

METHOD AND APPARATUS FOR COMPRESSION OF A TASK OUTPUT BY MACHINE LEARNING

CROSS REFERENCE TO RELATED APPLICATIONS

This application claims the benefit of Korean Patent Application Nos. 10-2021-0081155, filed Jun. 22, 2021 and 10-2022-0062820, filed May 23, 2022, which are hereby incorporated by reference in their entireties into this application.

BACKGROUND OF THE INVENTION

1. Technical Field

The present invention relates to a method and apparatus for distributed image data processing for machine learning.

2. Description of the Related Art

In general, image compression technologies mainly aim to increase compression ratios while maintaining high quality as perceived by people. However, in recent industries, the purpose of obtaining and transmitting an image is not simply to provide one that appears good to people but is often to perform a particular task.

For this, machine learning has recently been used to perform image compression to increase the compression ratio while performing the particular task as accurately as possible.

In such traditional image compression technology, the entire image is compressed and transmitted, so there is a limit to the extent to which the compression ratio can be increased while performing the particular task as accurately as possible.

SUMMARY OF THE INVENTION

Accordingly, the present invention has been made keeping in mind the above problems occurring in the prior art, and an object of the present invention is to provide a method and apparatus for distributed image data processing to provide a highly compressed image while maintaining machine learning performance.

In accordance with an aspect of the present invention to accomplish the above object, there is provided a method fir distributed image data processing, including performing machine learning on an original image to produce a plurality of different task outputs, combining the plurality of task outputs to extract at least one final output, and compressing the final output and transmitting the final output to a server.

The task output may include a first result, which is a description of a portion extracted from the original image, and a second result, which is an image containing a particular region extracted from the original image.

The final output may be extracted by respectively labeling the first results of the plurality of task outputs.

The final output may be extracted by combining overlapping regions of the second results of the plurality of task outputs.

The first result may include at least one of coordinates of the extracted portion, a color property of the extracted portion, or whether there is a pixel in the extracted portion or a combination thereof.

The method may further include restoring the transmitted final output, and extracting an additional output by performing machine learning on the restored final output.

The additional output may be obtained by at least one of object tracking, pose estimation, action recognition, or a combination thereof.

The method may further include providing the additional output to a user.

The machine learning may use a neural network.

In accordance with another aspect of the present invention to accomplish the above object, there is provided an apparatus for distributed image data processing, including memory configured to store a control program for distributed image data processing, and a processor configured to execute the control program stored in the memory, wherein the processor is configured to perform machine learning on an original image to produce a plurality of different task outputs, combine the plurality of task outputs to extract at least one final output, compress the final output, and transmit the final output to a server.

The task output may include a first result, which is a description of a portion extracted from the original image, and a second result, which is an image containing a particular region extracted from the original image.

The final output may be extracted by respectively labeling the first results of the plurality of task outputs.

The final output may be extracted by combining overlapping regions of the second results of the plurality of task outputs.

The first result may include at least one of coordinates of the extracted portion, a color property of the extracted portion, or whether there is a pixel in the extracted portion or a combination thereof.

The processor may be further configured to restore the transmitted final output and extract an additional output by performing machine learning on the restored final output.

The additional output may be obtained by at least one of object tracking, pose estimation, action recognition or a combination thereof.

The processor may be further configured to provide the additional output to a user.

The machine learning may use a neural network.

BRIEF DESCRIPTION OF THE DRAWINGS

The above and other objects, features and advantages of the present invention will be more clearly understood from the following detailed description taken in conjunction with the accompanying drawings, in which:

FIG. 7 is a diagram illustrating an object detection inference result;

FIG. 9 is a diagram illustrating BPP calculation values depending on data formats;

FIG. 10 is a diagram illustrating mean average precision (mAP) measurement results.

DESCRIPTION OF THE PREFERRED EMBODIMENTS

Figure 1:
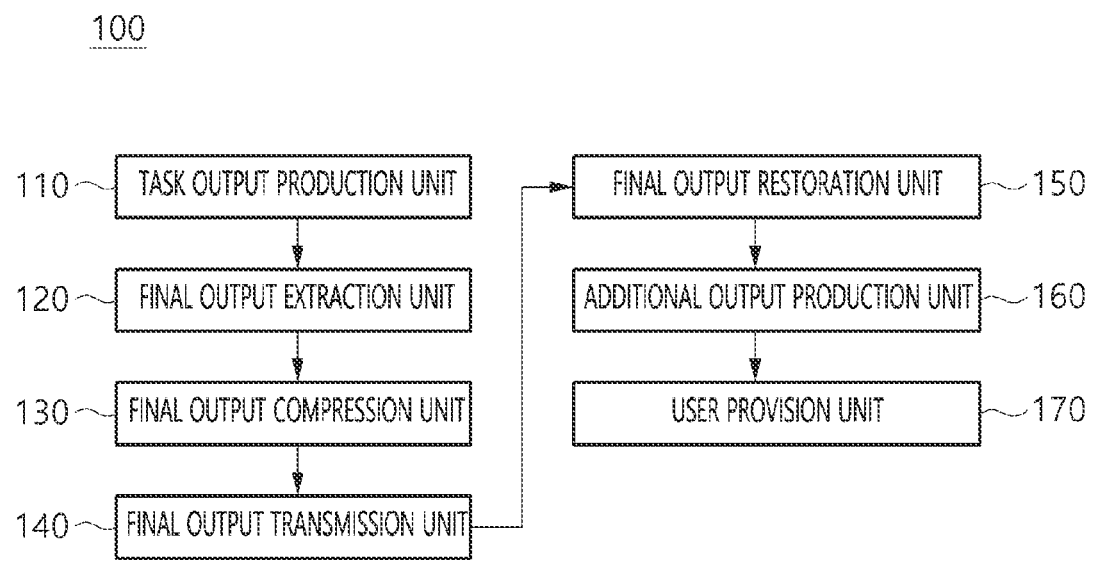
FIG. 1 is a block diagram of an apparatus for distributed image data processing according to an embodiment of the present invention.

Advantages and features of the present invention and methods for achieving the same will be clarified with reference to embodiments described later in detail together with the accompanying drawings. However, the present invention is capable of being implemented in various forms, and is not limited to the embodiments described later, and these embodiments are provided so that this invention will be thorough and complete and will fully convey the scope of the present invention to those skilled in the art. The present invention should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present invention.

The terms used in the present specification are merely used to describe embodiments, and are not intended to limit the present invention. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present invention pertains. Further, terms defined in generally used dictionaries are not to be interpreted as having ideal or excessively formal meanings unless they are definitely defined in the present specification.

Embodiments of the disclosure will now be described in detail with reference to the accompanying drawings. Like numerals refer to like elements throughout, and overlapping descriptions will not be repeated, FIG. 1 is a block diagram of an apparatus for distributed image data processing (hereinafter also referred to as a 'distributed image data processing apparatus') according to an embodiment of the present invention.

Referring to FIG. 1, a distributed image data processing apparatus 100 according to an embodiment of the present invention may use an original image to perform a particular task for a purpose and process an image in a distributed fashion.

The distributed image data processing apparatus 100 according to an embodiment may include a task output production unit 110, a final output extraction unit 120, a final output compression unit 130, a final output transmission unit 140, a final output restoration unit 150, an additional Output production unit 160, and a user provision unit 170.

In an embodiment of the present invention, the distributed image data processing apparatus 100 may include only part of the whole configuration.

The task output production unit 110 may generate a plurality of different task outputs by performing machine learning on an original image. The machine learning may be performed using neural network based deep-learning models. The neural network may include a single configuration to produce a plurality of task outputs or multiple configurations to produce the respective task outputs.

The task output may include a first result (inference result), which is a description of a portion extracted from the original image, and a second result (residue), which is an image containing a particular region extracted from the original image, without being limited thereto.

The first result may include at least one of coordinates of the portion extracted from the original image, a color property of the extracted portion, or whether there is a pixel (e.g., 0/1) in the extracted portion, or a combination thereof, but is not limited thereto. The second result may be, but is not limited to, an image of an extracted portion required for a particular task.

The final output extraction unit 120 may extract a final output derived by labeling the respective first results of the plurality of task outputs. The final output extraction unit 120 may extract a final output $1w$ combining overlapping regions of the second results of the plurality of task outputs.

The final output compression unit 130 may encode and compress the respective final outputs. The final output transmission unit 140 may transmit the compressed result to a server or a cloud.

The final output restoration unit 150 may restore the compressed final output. The final output restoration unit 150 may also receive the compressed final output from the server or cloud.

The additional output production unit 160 may extract additional output by performing machine learning on the restored final output. The additional output may be obtained by at least one of object tracking, pose estimation, action recognition or a combination thereof.

The user provision Lunt 170 may selectively provide the final output and the additional output to the user.

In the case in which the distributed image data processing apparatus 100 includes two parts in an embodiment of the present invention, which are a transmission unit and a reception unit, the transmission unit may include the task output production unit 110, the final output extraction unit 120, the final output compression unit 130, and the final output transmission unit 140, and the reception unit may include the final output restoration unit 150, the additional output production unit 160, and the user provision unit 170. The reception unit may include, but is not limited to, a server or a cloud.

Figure 2:
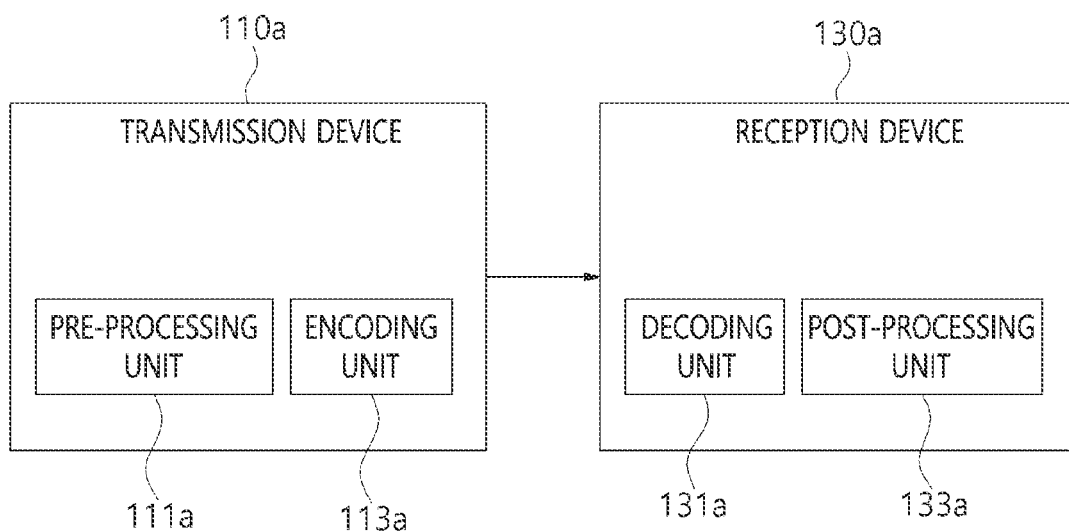
FIG. 2 is a block diagram of an apparatus for distributed image data processing according to another embodiment of the present invention.

FIG. 2 is a block diagram of an apparatus for distributed image data processing according to another embodiment of the present invention.

In the embodiment of the present invention, the distributed image data processing apparatus 100 may be broadly divided into a transmission device 110*a* and a reception device 130*a*.

The transmission device 110*a* may refer to a device that performs one or more tasks based on an input image (or video) or information about characteristics of the input image, and compresses and transmits a result of the performing.

In this case, the task may be performed based on a machine including one or more network layers, and the result of the performing may include at least one of a partial image extracted from the input image or a descriptor of the extracted partial image or a combination thereof. The at least one partial extracted image may have a different attribute for each task, and the attribute may include at least one of size/position information of the extracted image, identification information (index) for identifying each extracted image, whether there is a pixel in the extracted image, a range of pixel values, a resolution or a descriptor of an object included in the extracted image, or a combination thereof. The attribute may be interpreted in a manner the same as or similar to the descriptor of the extracted image, or may be defined to be conceptually different from the descriptor.

The transmission device 110a may include a pre-processing unit 111a and an encoding unit 113a. The pre-processing unit 111a may be implemented in a separate form from the encoding unit 113a, or may be implemented in a form included in the encoding unit 113a.

The pre-processing unit 111a may perform a particular task on the input image (e.g., a task for finding an object such as a person, a criminal, a terrorist, a vehicle, etc.), and may further involve an operation of separating/extracting only an image of the found object. The particular task may be performed based on a machine in the pre-processing unit 111a. Especially, depending on the particular task, all of the plurality of network layers may be used, or only one or some of the network layers may be selectively used. A different network layer may be separately defined for at least one task.

The encoding unit 113a may include at least one of a video encoder, a descriptor encoder or a feature encoder or a combination thereof.

The video encoder may encode an input image into a video stream using a certain codec. The input image may be a pre-processed image or an image for which pre-processing is skipped. The input image is not limited to an image input to the transmission unit, but may be understood to conceptually include an image extracted in the pre-processing unit 311a. For this, the encoding unit 113a may further perform additional processing procedures on the extracted image (e.g., resizina, resolution control, combination of extracted images, etc.).

The descriptor encoder may generate an inference stream by encoding at least one of an inference result from the pre-processing unit 111a or a descriptor based on the inference result. The feature encoder may generate a feature stream by encoding feature information from the extracted image.

The image stream, the inference stream, and the feature stream may be integrated into one stream to be transmitted to the reception device 130a, or may be respectively transmitted to the reception device 130a without an extra integration procedure. Alternatively, only parts of the image stream, the inference stream, or the feature stream may be integrated and transmitted to the reception device 130a.

The reception device 130a may include a decoding unit 131a and a post-processing unit 133a. The post-processing unit 133a may be implemented in a separate form from the decoding unit 131a, or may be implemented in a form included in the decoding unit 131a.

Similar to the encoding unit 113a, the decoding unit 131a may include at least one of a video decoder, a descriptor decoder, or a feature decoder, or a combination thereof, and may decode the associated streams by inversely performing the processing procedure in the encoding unit 113a.

The post-processing unit 133a may perform a task based on the same network layers as the machine embedded in the pre-processing unit 111a in the transmission device 110a to produce output, the details of which will not be described.

What will be described belw may be used in the aforementioned distributed image data processing apparatus.

Figure 3:
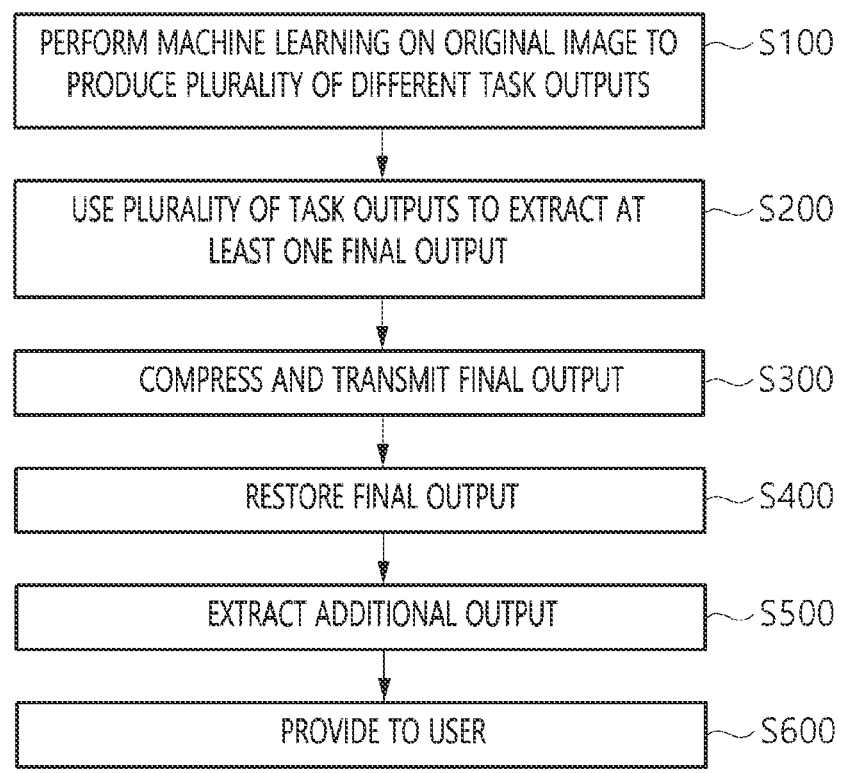
FIG. 3 is a flowchart illustrating a method for distributed image data processing according to an embodiment of the present invention.

FIG. 3 is a flowchart illustrating a method for distributed image data processing (hereinafter also referred to as a 'distributed image data processing method') according to an embodiment of the present invention. The distributed image data processing method may be performed in the distributed image data processing apparatus.

Referring to FIG. 3, the distributed image data processing method may include performing machine learning on an original image to produce a plurality of different task outputs at step S100, extracting at least one final output by combining the plurality of task outputs at step S200, compressing and transmitting the final output at step S300, restoring the compressed final output at step S400, extracting an additional output from the restored final output at step S500, and providing the final output and the additional output to the user at step S600.

The distributed image data processing method according to an embodiment of the present invention will now be described in detail in connection with FIG. 3.

Figure 4:
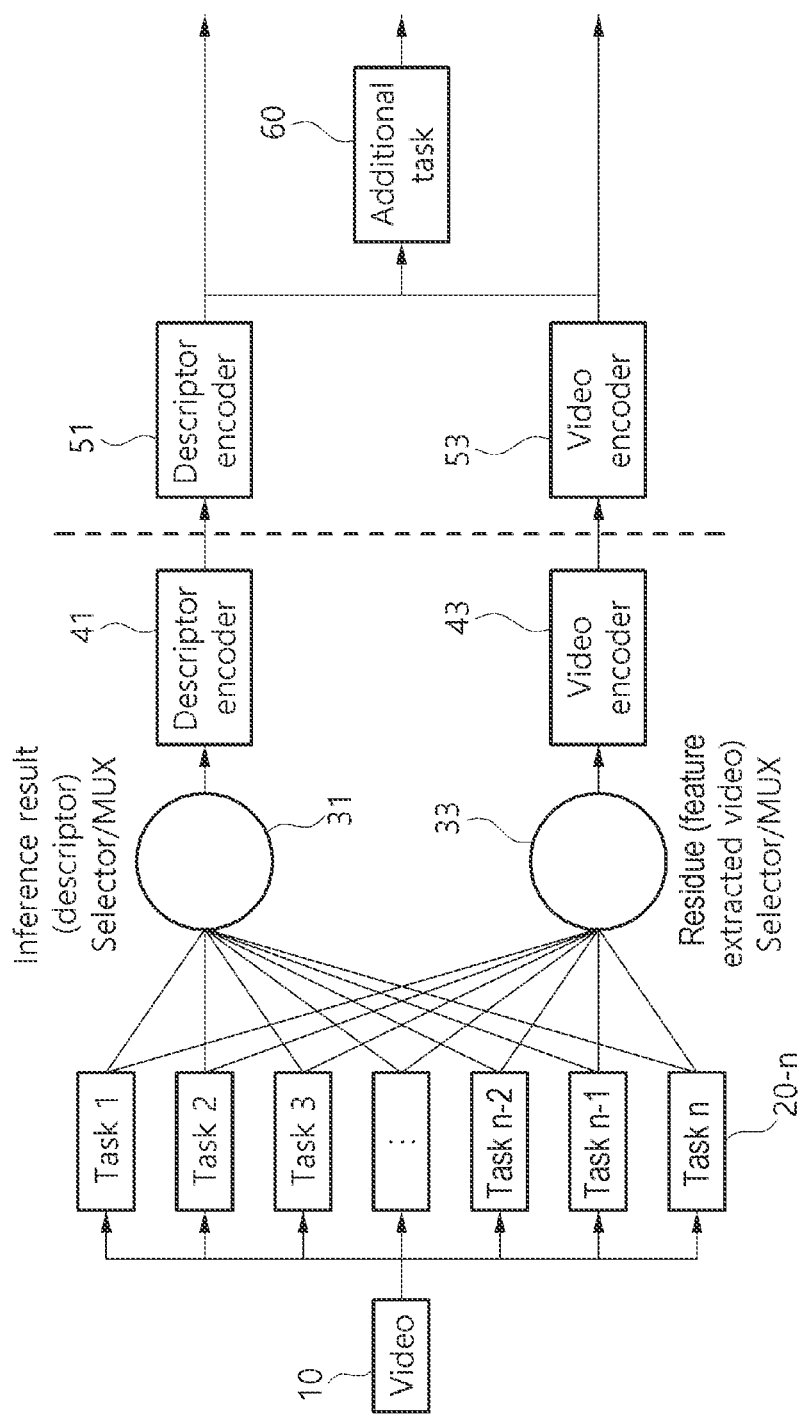
FIG. 4 is a detailed diagram for explaining a method for distributed image data processing according to an embodiment of the present invention.

FIG. 4 is a detailed diagram for explaining a method for distributed image data processing according to an embodiment of the present invention.

Referring to FIG. 4, the distributed image data processing method according to an embodiment may include compressing and transmitting the entire image, or extracting, compressing and transmitting a required portion of the image. In the present invention, an image may be used to perform a task for a purpose. The image may be an original image or an image created by decoding an encoded original image.

In the present invention, the task may be object detection, segmentation, etc., without being limited thereto. Furthermore, the task may be output of machine learning, or may correspond to a process for a particular task (e.g., resizing, rotation, cutting, etc.).

One or more task outputs may be produced, and each task output may include at least one of a first result or a second result. The first result may be an inference result and the second result may be a residue. For example, the inference result is a descriptor of an image region extracted from a task, and may include at least one of coordinates, a color property, or whether there is a pixel (e.g., 0/1). The residue may correspond to an image of an extracted portion required for a particular task.

There may be several particular tasks that intend to use an image. In this case, residues of the respective tasks may overlap. The overlapping portions may be subjected to an OR operation in a residue selector/MUX, and a finally extracted image may be compressed and transmitted. An interference result from each task may be labeled for the task and may be separately compressed and transmitted.

The reception unit may use the task outputs separately, or may combine two or more task outputs to perform an additional task (e.g., object tracking, pose estimation, action recognition, etc.). Information about whether to use the task outputs respectively or in combination may also be compressed. Furthermore, information for identifying task outputs in combination e.g., a lookup table or index information) may further be compressed.

Referring to FIG. 4, the distributed image data processing apparatus according to the embodiment of the present invention may produce n task outputs 20 by performing machine learning on an original image 10.

The distributed image data processing apparatus may extract a first final output by labeling the respective first results of the n task outputs using a selector/multiplexer (MUX) 31. The distributed image data processing apparatus may extract a second final output by combining overlapping regions of the second results of the n task outputs using a selector/MUX 33. The second final output may be extracted by performing an OR operation on the overlapping regions of the second results in the selector/MUX 33.

The distributed image data processing apparatus may compress the first final output using an encoder 41. The distributed image data processing apparatus may compress the second final output using a video encoder 43.

A reception unit of the distributed image data processing apparatus may restore the compressed first final output using a decoder 51. The reception unit of the distributed image data processing apparatus may restore the compressed second final output using a video decoder 53.

The reception unit of the distributed image data processing apparatus may extract additional output by performing an additional task 60 on the first final output and the second final output.

The reception unit of the distributed image data processing apparatus may selectively provide the first final output, the second final output, and the additional output at the request of the user.

An embodiment of the distributed image data processing method in the present invention will now be described.

Figure 5:
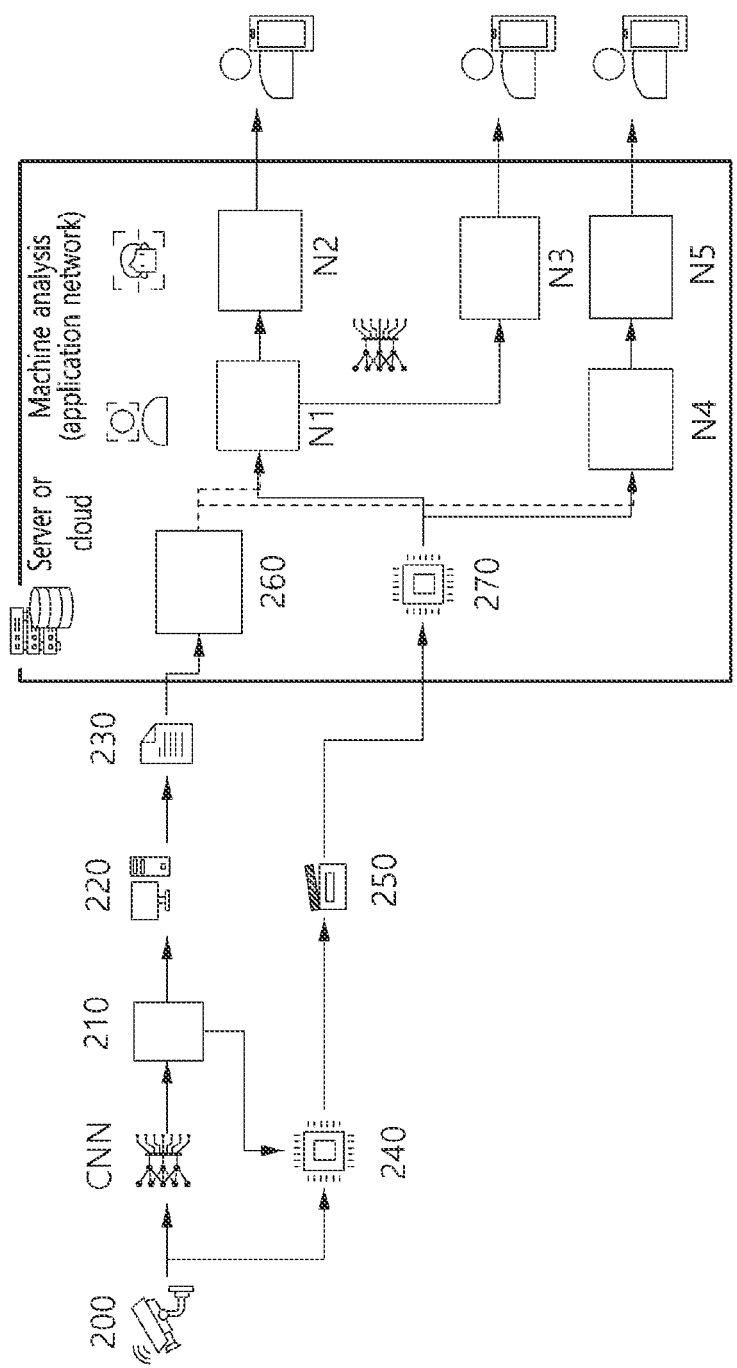
FIG. 5 is a diagram for explaining a use case scenario that uses a neural network inference result according to an embodiment of the present invention.

FIG. 5 is a diagram for explaining a use case scenario that uses a neural network inference result according to an embodiment of the present invention.

FIG. 5 shows a use case in which detection of humans is performed on an image captured by a camera and the result is used for various purposes.

First, a human object 210 in the image captured by a camera 200 may be detected through CNN. The detected information may be used and represented by a descriptor, and may then be binarized 220 and compressed 230.

Image compression 250 may be performed by reducing image quality for all but a region where a person appears and increasing image quality (240) for the region where the person appears. After this, the descriptor binarized file and the compressed image may be sent to a server or a cloud.

The server or the cloud may return the binarized result to the descriptor and restore the compressed image 260. Various tasks related to humans may be quickly performed by restoring the binarized result of the region to the region where a person appears and restoring the compressed image.

For example, face detection N1 may be performed by combing the two results, and the result of the face detection N1 may be used for tasks of face recognition N2 and facial expression detection. Furthermore, pose recognition (pose estimation) N4 may be performed within the region where the person appears, and simultaneously, a task for human action recognition N5 may be performed.

In an embodiment, additional information of inference results of an image may be used to increase image compression efficiency and perform various other tasks at the same time.

Figure 6:
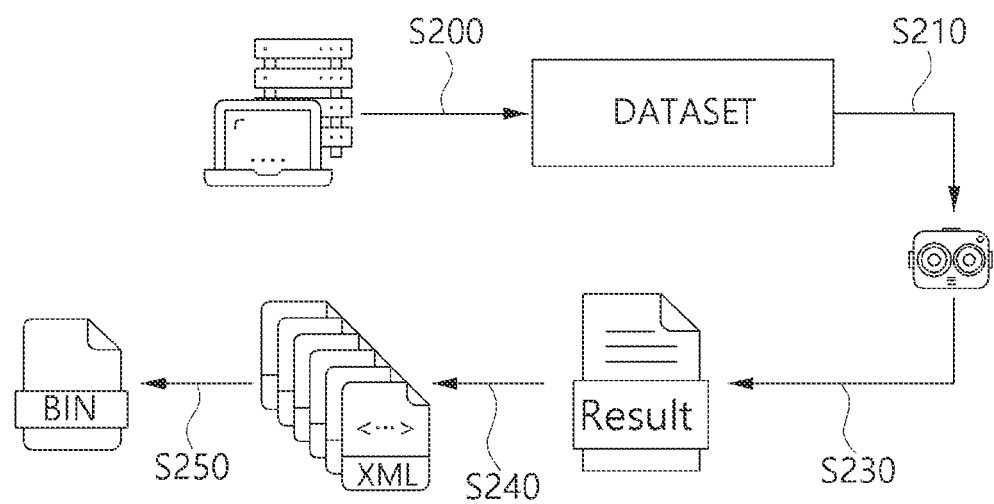
FIG. 6 is a diagram illustrating an experiment processor for extracting a neural network inference result according to an embodiment of the present invention.

FIG. 6 is a diagram illustrating an experiment processor for extracting a neural network inference result according to an embodiment of the present invention.

FIG. 6 shows an experiment conducted to determine a reduced size when a neural network inference result of an image is compressed by MPEG-7 descriptor binarization.

The experiment extracted a neural network inference result using Detectron2 developed by Facebook®, and represented the result in XML using a Region Locator descriptor of MPEG-7. Binarization was performed using Binary MPEG format for XML (BiM) reference software of MPEG-7. Using Detectron2, having excellent CNN inference performance, the results of object detection and object segmentation on two datasets may be represented by descriptors to determine associated efficiency.

The experiment in the present invention was conducted using 5,000 open image datasets for object detection and 5,000 COCO datasets for object segmentation. The Faster R-CNN x101-FPN model was used to derive an inference result of object detection, and the Mask R-CNN R50-FPN model was used to derive an inference result of object segmentation.

First of all, the dataset may be input to Detectron2 for inference. In the case of an object detection processor that uses an open image dataset, the open image set may be input thereto after being converted into a COCO dataset format at step S200. Inference may then be performed through CNN at step S210, and an inference result file may be extracted at step S230. The inference result file may be converted into an MPEG-7 descriptor format at step S240, and a CNN inference result represented in the MPEG-7 descriptor format may be binarized and compressed using the BiM reference software at step S250.

FIG. 7 is a diagram illustrating an object detection inference result.

Referring to FIG. 7, a file may extract and summarize only bounding-box information of an object from an object detection inference result file extracted through CNN.

Figure 8:
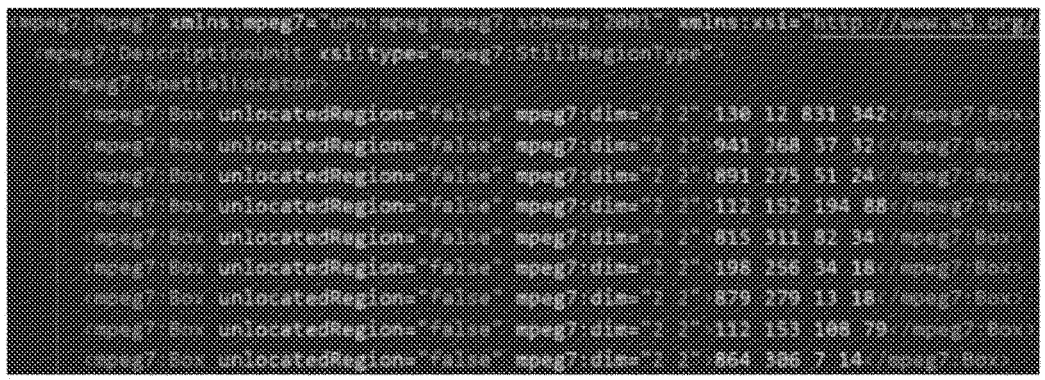
FIG. 8 is a diagram illustrating an object detection inference result represented by an MPEG-7 descriptor.

FIG. 8 is a diagram illustrating an object detection inference result represented by an MPEG-7 descriptor.

It may be seen that FIG. 8 shows an XLM file that represents the bounding-box information shown in FIG. 7 with an MPEG-7 Region Locator descriptor. Likewise, for an object segmentation result, an XML file was created by extracting bounding region polygon information of an object. The XML file was binarized by the BiM software.

The experiment compared original image sizes, inference result file sizes, sizes of XML files represented by MPEG-7 descriptors, and sizes of files compressed by binarization using BiM software between an open image dataset and a COC dataset. To check compression efficiency, bits per pixel (BPP) for each of the data formats were computed.

FIG. 9 illustrates BPP computation values depending on data formats.

As shown in FIG. 9, as for object detection, the binarized file size was reduced by 99.95% compared to the original image and by 72.2% compared to the text file. As for object segmentation, the binarized file size was reduced by 99.64% compared to the original image and by 68.4% compared to the JSON file.

FIG. 10 is a diagram illustrating mean average precision (mAP) measurement results.

FIG. 10 shows results of obtaining mean AP values of intersection over union (IoU) results having values of 0.5 or more as mAP measurement results. An original mAP is an mAP value measured through an inference result file in the existing method, and a restored mAP is an mAP value measured after the inference result file is converted to an MPEG-7 descriptor, binarized, and then restored back into the inference result file format. The original mAP of an object detection result of the open image dataset was 58.182, and the restored mAP was 58.133.

From this, it may be seen that there is a slight decrease in mAP when the descriptor binarization result is restored and used. The decrease in trtAP may result from an occasion when a floating-point method is used to represent a region of an object in the inference result file, which is converted into an integer type in the procedure of conversion to the MPEG-7 descriptor.

In the present invention, as a result of representing and binarizing the CNN inference result by the MPEG-7 descriptor, the mAP, which is an inference result estimation score, is slightly reduced but the volume is significantly reduced compared to the original image and the inference result file.

In the present invention, the light-weighted object region information may be transmitted to a server/cloud to be used in various advanced tasks. Furthermore, in the present invention, an inference result is used when a video is compressed, so a region of interest may be compressed with high image quality while the background is compressed with low quality, thereby increasing compression efficiency while maintaining the image quality of the region of interest.

Figure 11:
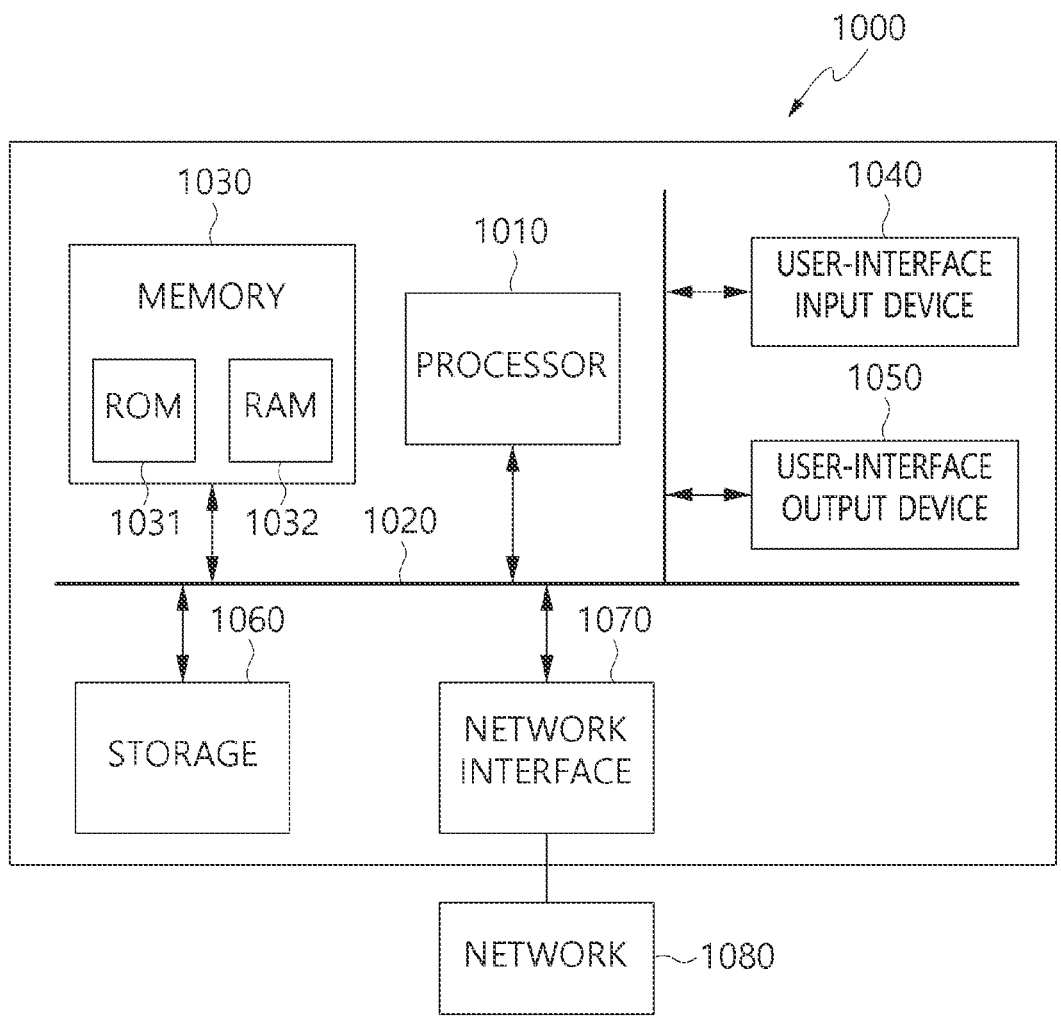
FIG. 11 is a block diagram illustrating the configuration of a computer system according to an embodiment of the present invention.

FIG. 11 is a block diagram illustrating the configuration of a computer system according to an embodiment of the present invention.

In an embodiment of the present invention, a distributed image data processing apparatus may be implemented in a computer system such as a computer-readable storage medium.

Referring to FIG. 11, the computer system 1000 may include one or more processors 1010, memory 1030, a user interface input device 1040, a user interface output device 1050, and a storage 1060, which communicate with one another through a is bus 1020. The computer system 1000 may further include a network interface 1070 connected to a network.

The processor 1010 may be a central processing unit (CPU) or a semiconductor device that executes a program or processing instructions stored in the memory 1030 or the storage 1060. The processor 1010 is a type of CPU, which may control the overall operation of the distributed image data processing apparatus 100.

The processor 1010 may include all kinds of devices that are able to process data. The term processor as herein used may refer to a data-processing device embedded in hardware having circuits physically constructed to perform a function represented in, for example, code or instructions included in the program. The data-processing device embedded in hardware may include, for example, a microprocessor, a CPU, a process core, a multiprocessor, an application-specific integrated circuit (ASIC), a field-programmable gate array (FPGA), etc., without being limited thereto.

The memory 1030 may store various types of data for overall operation, such as a control program to perform the distributed image data processing method according to embodiments of the present invention. Specifically, the memory 1030 may store multiple applications executed in the distributed image data processing apparatus, data, and instructions for operating the distributed image data processing apparatus.

Each of the memory 1030 and the storage 1060 may include at least one of volatile media, nonvolatile media, removable media, non-removable media, communication media, or information transfer media. For example, the memory 1030 may include read-only memory (ROM) 1031 or a random access memory (RAM) 1032.

In an embodiment of the present invention, a computer-readable storage medium storing a computer program may include instructions for a processor to perform a method including performing machine learning on an original image to produce a plurality of different task outputs, combining the plurality of task outputs to extract at least one final output, and compressing the final output and transmitting the same to a server.

According to the present invention, an image intended for machine use is processed through machine learning to extract an image, and a description of an extracted portion and the extracted image are transmitted, thereby increasing efficiency of compression and transmission.

Furthermore, according to the present invention, an image intended for machine use is subjected to distributed processing, and outputs resulting from the distributed processing respectively or in combination allow an additional task to be performed, thereby increasing efficiency in processing and utilizing the image.

The particular implementations shown and described herein are illustrative examples of the present invention and are not intended to limit the scope of the present invention in any way. For the sake of brevity, conventional electronics, control systems, software development, and other functional aspects of the systems may not be described in detail. Furthermore, the connecting lines or connectors shown in the various presented figures are intended to represent exemplary functional relationships and/or physical or logical couplings between the various elements. It should be noted that many alternative or additional functional relationships, physical connections, or logical connections may be present in an actual device. Moreover, no item or component may be essential to the practice of the present invention unless the element is specifically described as "essential" or "critical".

The present invention should not be construed as being limited to the aforementioned embodiments, and it will be obvious that not only the accompanying claims but also their equivalents fall under the scope of the present invention.

What is claimed is:

1. A method for generating compressed image data, comprising:
   extracting from an original image a plurality of partial regions;
   generating an extracted image by combining the plurality of partial regions;
   generating inference data for the plurality of partial regions; and
   generating compressed image data by encoding the extracted image and the inference data for the plurality of partial regions,
   wherein the inference data comprises:
   position data representing a coordinate of a partial region extracted from the original image, and
   size data representing a size of the partial region extracted from the original image,
   wherein the position data and the size data are encoded for each of the plurality of partial regions, and
   wherein a size of the extracted image is different from a size of the original image.

2. The method of claim 1, wherein the inference data further comprises information on whether there is a pixel in an extracted partial region.

3. The method of claim 1, wherein the method further comprises adjusting a spatial resolution of the extract image, the extract image with an adjusted spatial resolution being encoded to generate the compressed image data.

4. The method of claim 1, wherein the plurality of partial regions are extracted by performing a plurality of tasks.

5. The method of claim 1, wherein the plurality of partial regions are extracted by a machine learning based on a neural network.

6. An apparatus for generating compressed image data processing, comprising:
- a memory configured to store a control program for generating the compressed image data; and
- a processor configured to execute the control program stored in the memory,
- wherein the processor is configured to:
- extract from an original image a plurality of partial regions;
- generate an extracted image by combining the plurality of partial regions;
- generate inference data for the plurality of partial regions; and
- generate the compressed image data by encoding the extracted image and the inference data for the plurality of partial regions,
- wherein the inference data comprises:
- position data representing a coordinate of a partial region extracted from the original image, and
- size data representing a size of the partial region extracted from the original image,
- wherein the position data and the size data are encoded for each of the plurality of partial regions, and
- wherein a size of the extracted image is different from a size of the original image.

7. A method for decompressing compressed image data, comprising:
- decoding an extracted image from the compressed image data, the extracted image comprising a plurality of partial regions;
- obtaining inference data for the plurality of partial regions in the extracted image; and
- generating an output image from the extracted image,
- wherein the inference data comprises:
- position data representing a coordinate of a partial region included in the extracted image, and
- size data representing a size of the partial region included in the extracted image,
- wherein the position data and the size data are obtained for each of the plurality of partial regions, and
- wherein a size of the extracted image is different from a size of the output image.

* * * * *